(12) United States Patent
Carson (10) Patent No.: US 9,177,593 B2
(45) Date of Patent: Nov. 3, 2015

(54) IMAGE ARCHIVE DISC

(71) Applicant: Doug Carson & Associates, Inc., Cushing, OK (US)

(72) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 14/280,176

(22) Filed: May 16, 2014

(65) Prior Publication Data

US 2014/0341009 A1     Nov. 20, 2014

Related U.S. Application Data

(60) Provisional application No. 61/824,443, filed on May 17, 2013.

(51) Int. Cl.
*G11B 7/24*     (2013.01)
*G11B 7/24094*  (2013.01)
*G11B 7/00*     (2006.01)

(52) U.S. Cl.
CPC .... *G11B 7/24094* (2013.01); *G11B 2007/0016* (2013.01); *G11B 2220/20* (2013.01)

(58) Field of Classification Search
None
See application file for complete search history.

(56) References Cited

U.S. PATENT DOCUMENTS

| | | | |
|---|---|---|---|
| 3,842,197 A | 10/1974 | Broussaud et al. | |
| 5,518,325 A * | 5/1996 | Kahle | 347/2 |
| 8,089,852 B2 | 1/2012 | Carson et al. | |
| 8,140,481 B2 | 3/2012 | Sato et al. | |
| 2004/0021907 A1* | 2/2004 | Truc et al. | 358/1.18 |
| 2004/0062179 A1* | 4/2004 | Tsurumi et al. | 369/108 |
| 2004/0136293 A1 | 7/2004 | Matos | |
| 2005/0240445 A1 | 10/2005 | Sutherland et al. | |
| 2006/0018243 A1* | 1/2006 | Ohtsubo et al. | 369/275.1 |
| 2007/0019064 A1* | 1/2007 | Yamada et al. | 347/224 |
| 2007/0297312 A1* | 12/2007 | Wolfe et al. | 369/100 |
| 2009/0073850 A1 | 3/2009 | Ide et al. | |
| 2010/0046344 A1* | 2/2010 | Mikoshiba et al. | 369/100 |
| 2011/0238911 A1 | 9/2011 | Kong | |

* cited by examiner

*Primary Examiner* — Thang Tran
(74) *Attorney, Agent, or Firm* — Hall Estill Attorneys at Law (57) ABSTRACT

Method and apparatus for storing archive images to a substrate, such as a rotatable optical disc. In some embodiments, the substrate stores a plurality of archived images in a human detectable form on a surface of the substrate and further stores control data associated with the archived images to facilitate optical recovery of said human detectable images from the surface.

20 Claims, 10 Drawing Sheets

WRITE SYSTEM

THE NAMES AND ORDER OF THE
BOOKS OF THE HOLY BIBLE
WITH THE NUMBER OF THEIR CHAPTERS

THE BOOKS OF THE OLD TESTAMENT

| | *Page* | *Chapters* |
|---|---|---|
| Genesis | x | 50 |
| Exodus | x | 40 |
| Leviticus | x | 27 |
| Numbers | x | 36 |
| Deuteronomy | x | 34 |
| Joshua | x | 24 |
| Judges | x | 21 |
| Ruth | x | 4 |
| 1 Samuel | x | 31 |
| 2 Samuel | x | 24 |
| 1 Kings | x | 22 |
| 2 Kings | x | 25 |
| 1 Chronicles | x | 29 |
| 2 Chronicles | x | 36 |
| Ezra | x | 10 |
| Nehemiah | x | 13 |
| Esther | x | 10 |
| Job | x | 42 |
| Psalms | x | 150 |
| Proverbs | x | 31 |

| | *Page* | *Chapters* |
|---|---|---|
| Ecclesiastes | x | 8 |
| Song of Songs | x | 12 |
| Isaiah | x | 66 |
| Jeremiah | x | 52 |
| Lamentations | x | 5 |
| Ezekiel | x | 48 |
| Daniel | x | 12 |
| Hosea | x | 14 |
| Joel | x | 3 |
| Amos | x | 9 |
| Obadiah | x | 1 |
| Jonah | x | 4 |
| Micah | x | 7 |
| Nahum | x | 3 |
| Habakkuk | x | 3 |
| Zephaniah | x | 3 |
| Haggai | x | 2 |
| Zechariah | x | 14 |
| Malachi | x | 4 |

THE BOOKS OF THE NEW TESTAMENT

| | *Page* | *Chapters* |
|---|---|---|
| Matthew | 757 | 28 |
| Mark | 785 | 16 |
| Luke | 803 | 24 |
| John | 833 | 21 |
| Acts | 857 | 28 |
| Romans | 887 | 16 |
| 1 Corinthians | 899 | 16 |
| 2 Corinthians | 911 | 13 |
| Galatians | 919 | 6 |
| Ephesians | 923 | 6 |
| Philippians | 927 | 4 |
| Colossians | 931 | 4 |
| 1 Thessalonians | 933 | 5 |
| 2 Thessalonians | 939 | 3 |

| | *Page* | *Chapters* |
|---|---|---|
| 1 Timothy | 941 | 6 |
| 2 Timothy | 945 | 4 |
| Titus | 949 | 3 |
| Philemon | 951 | 1 |
| Hebrews | 953 | 13 |
| James | 963 | 5 |
| 1 Peter | 967 | 5 |
| 2 Peter | 971 | 3 |
| 1 John | 973 | 5 |
| 2 John | 977 | 1 |
| 3 John | 979 | 1 |
| Jude | 981 | 1 |
| Revelation | 983 | 22 |

FIG. 17E

# IMAGE ARCHIVE DISC

RELATED APPLICATIONS

This application makes a claim of domestic priority under 35 U.S.C. §119(e) to U.S. Provisional Patent Application No. 61/824,443 filed May 17, 2013, the contents of which are incorporated herein by reference.

BACKGROUND

A variety of data storage media have been proposed in the art to store and retrieve digitally encoded data in a fast and efficient manner. Such media include magnetic recording discs, optical recording discs, solid-state memories (e.g., flash memory), etc.

Some media, such as conventional optical discs, can be rotated at a selected velocity while a head assembly transduces a read back signal to recover a data pattern stored to a media surface. The data patterns are often arranged on such media along a series of concentric tracks (e.g., discrete rings, a continuous spiral, etc.) that extend circumferentially around the surface of the disc. An actuator, under the control of a closed loop servo circuit, can be moved to radially position the head assembly adjacent the tracks in order to recover the data patterns by detecting a succession of optically discernable marks (e.g., pits and lands, etc.).

Optical discs are currently used to store a variety of different types of data, such as random access computer programming data (e.g., game console discs, etc.) and streamed audio/video data (e.g., audio discs, movie discs, etc.). A number of commercially successful, widely-implemented standards for optical discs have been developed including compact disc (CD), digital versatile disc (DVD), high density DVD (HD-DVD), Blu-Ray (BD), etc. These and other standards often call for the arrangement of the user data in the form of addressable data blocks, or sectors, of selected size (e.g., 2352 bytes, etc.). Control information such servo data, subcode bits, address headers, error detection and correction (EDC) codes (P0 and P1 parity codes, Reed Solomon codes, etc.) may also be stored to the disc to facilitate the recovery of the user data blocks.

While operable to store relatively large amounts of data in a computerized format, a limitation to the use of optical discs and other forms of media to store documents and other archived objects is the software and/or hardware requirements necessary to locate, decode and reconstruct the archived objects.

For example, it has not been that many years ago when a popular archive media was the 3½ inch floppy diskette; today, it is becoming increasingly difficult to even locate a 3½ inch floppy diskette drive to enable files from this format to be accessed. Similarly, new codecs, versions of software, drivers, etc. make it increasingly less likely that files stored in the form of computerized data using existing software formats will be able to be easily recovered in the future after even a moderate amount of time has passed.

SUMMARY

Accordingly, various embodiments of the present disclosure are generally directed to a method and apparatus for archiving image data on a substrate (carrier), such as a rotatable optical disc.

In some embodiments, the substrate stores a plurality of archived images in a human detectable form on a surface of the substrate and further stores control data associated with the archived images to facilitate optical recovery of said human detectable images from the surface.

In other embodiments, a system for forming an image archive substrate comprises an image layout system which generates input data corresponding to a plurality of human detectable archive images. A control data generator generates control data associated with the archive images. A recording device impinges a recording layer of a substrate with a write beam to store the archive images in a human detectable form and to store the control data to facilitate optical recovery of the archive images from the recording layer.

In other embodiments, a method of archiving images includes steps of using a write beam of a recording device to store a plurality of archived images in a human detectable form and control data associated with the archived images on a substrate; and retrieving at least a selected one of the archived images using a readback device which optically detects the images from the substrate and outputs the detected images for display on a display device.

BRIEF DESCRIPTION OF DRAWINGS

FIGS. 17A-17E illustrate an example archive substrate constructed in accordance with various embodiments of the present disclosure.

DETAILED DESCRIPTION

Various embodiments of the present disclosure are generally directed to an apparatus and method for storing and retrieving archive images using a specially configured substrate, which may be in the form of an optical disc. As explained below, in at least some embodiments a plurality of images in the form of document pages are embossed onto a substrate (carrier). Control information such as identification information, metadata, computer readable data files, etc. may also be formed on the archive substrate. A specially configured readback system is used to access and retrieve the stored images for a user.

Unlike conventional optical discs which store archive images in the form of computerized data, the archive substrates of the present disclosure are generally configured to store the archive images directly to the substrate in a human detectable (readable) form, albeit with the need to apply significant magnification to reveal the images for human detection. In this way, the images can be recovered through direct optical means without the need to use codecs, various versions of software, drivers, etc. to access non-human readable, computer readable files stored in the form of encoded digital data and to convert such files to a human readable format. This ensures that the images will be recoverable in the future regardless of the obsolescence of current generation computer systems and storage formats, and eliminates the need to convert the images to newer generations of readers and media formats over time.

Figure 1A:
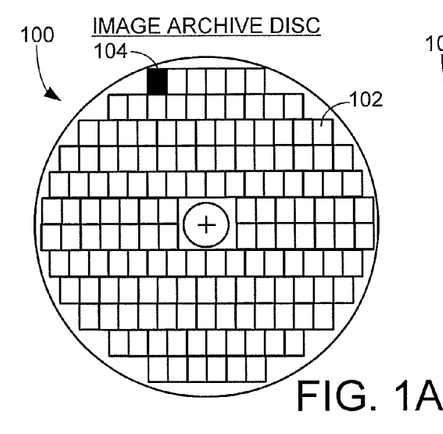
FIGS. 1A and 1B illustrate exemplary formats for image archive substrates in accordance with some embodiments.
Figure 1B:
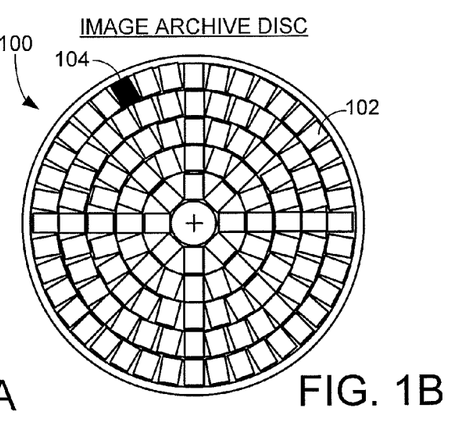

These and other features and advantages of the various embodiments disclosed herein can be understood beginning with a review of FIGS. 1A-1B which respectively illustrate different formats for an archive image substrate 100. The substrate 100, also referred to as an archive optical disc, is a rotatable disc-shaped substrate on which a number of archive images 102 are arranged. It will be appreciated that other forms, types, shapes, styles and configurations of archive substrates can be used apart from those set forth in FIGS. 1A-1B.

The images 102 are arranged in rows and columns in FIG. 1A, and arranged in concentric rings in FIG. 1B. All of the images 102 in FIG. 1A are oriented in the same direction, whereas the orientation of the images 102 in FIG. 1B depend on angular positions of the images about the circumference of the substrate. It will be appreciated that, in practice, the images 102 will be substantially smaller so that many thousands or millions of images (e.g., document pages) may be formed on a single side (recording layer) of the disc. While it is contemplated that the disc 100 has the form factor for a conventional optical disc, such as a DVD or BD disc with an outermost diameter of nominally 120 millimeters, mm, such is merely exemplary and not limiting. Each image 102 is shown to be rectilinear, but other image shapes can be used.

At this point it will be noted that each of the images 102 is in a human readable form, albeit with the requirement that some sort of magnification be applied in order for an ordinary human observer to actually decode the contents of each message. The image content can take any desired form. In one embodiment, each of the images 102 constitutes a document with alphanumeric characters in a selected language. Other forms of images can be used, including graphics, patterns, datasets, etc. The archive substrate is thus analogous to a "microfilm" or microfiche" style medium with two hue (e.g., black/white) or multi-hue components.

Figure 2:
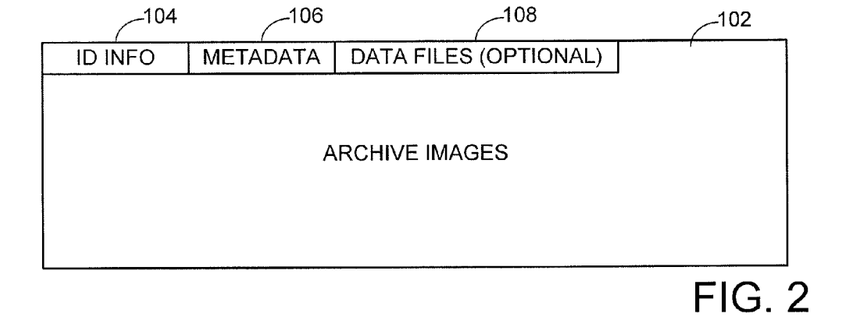
FIG. 2 is a data format structure for the archive substrates of FIGS. 1A-1B.

It is contemplated that the archive disc 100 will have an overall informational content arranged as depicted in FIG. 2. An identification (ID) field 104 stores ID information to enable a readback system to determine the location and/or contents of the images on the disc 100. In some embodiments, the ID field provides an index reference point to enable the system to locate the beginning point in the sequence of archived images 102 so that the exact location of individual images can be quickly and easily determined.

The ID field may be a specially configured tile, such as denoted in FIGS. 1A-1B, so that the ID tile 104 is nominally the same size as the rest of the archive images (pages) 102. This allows the recovery system to locate the ID tile 104 and use this as a reference to identify both the locations and sizes (e.g., length×width) of other archive images on the substrate. As discussed more fully below, the individual images 102 may have length and width dimensions on the order of a few microns, μm ($10^{-6}$ m) each, such as on the order of about 25 μm or less.

As desired, metadata may be stored in one or more metadata fields 106 to further enable location of the individual images 102. The metadata may provide a number of different types of control information such as the number and style of images, datecode information, map location information, etc.

Computer data files may further be stored as indicated at 108. The data files can take any suitable form and, like the ID information and the metadata, may be in the form of computer readable data (as opposed to human detectable images as in the archive images 102). In some embodiments, some or all of the images may be separately encoded as image files (e.g., JPEG files, word processing files, etc.) so that both human readable and computer readable copies of various documents are stored on the same disc 100. Depending on resolution, the real estate taken up by an archived image 102 may be significantly smaller than the corresponding data footprint if the image was converted to digital form and stored as a file on the disc.

Figure 3:
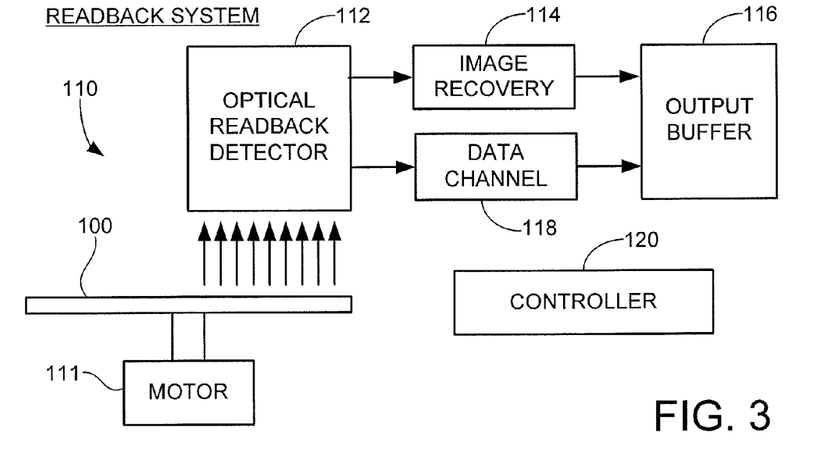
FIG. 3 is a readback system operable to recover the data from FIG. 2 from the substrates in FIGS. 1A-1B.

FIG. 3 is a functional block representation of a readback system 110 adapted to recover data from the discs 100 of FIGS. 1A-1B. A motor 111 rotates a selected archive disc 100 at a selected velocity, and an optical readback detector 112 optically scans the presented surface of the disc 100. The detector may be a single detector (e.g., a CCD device, etc.), or may be multiple detector devices to detect the different types of data stored to the disc 100. Computerized data detection methodologies can include magnetic, topographical, electrical, etc.

An image recovery block 114 provides signal processing to capture and output digitized copies of the archived images to an output buffer 116 pending transfer to a host device (not separately shown). A data read channel 118 provides signal processing to decode the computer readable data (ID info, metadata, computer files) and, as desired, output such to the buffer 116. A controller 120 provides top level control for the system 110.

Figure 4:
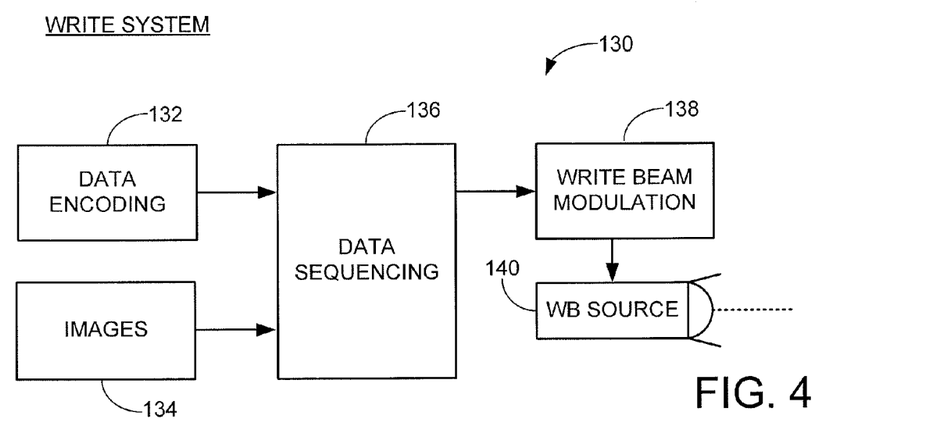
FIG. 4 is a write system adapted to write data to the substrates of FIGS. 1A-1B.

FIG. 4 is a functional block diagram for a write system 130 useful in writing data to the disc 100. A data encoding block 132 generates and encodes the computer readable data. An image processing block 134 prepares the individual images for transfer to the disc. A data sequencing block 136 provides a data sequence for a write beam modulation block 138 to use in the generation of one or more modulation signals for use by a write beam source 138 to write data to the disc (or to a master disc from which a population of replicated discs can be produced).

A variety of techniques can be applied to write the images 102 to the disc 100. In some embodiments, a technique referred to as "nano archiving" can be used where individual pages are etched onto the surface of a material with long term archival properties.

In some embodiments, the write beam selectively exposes a coating layer of energy responsive material, such as but not limited to photo, thermal, phase change or other reactive material. The material can be applied to an underlying substrate using any suitable mechanism such as but not limited to spin coating, sputtering, growth, etc.

The exposed material is subjected to metallization processing to form stampers that can be used in an injection molding process to generate a population of replicated discs. The same laser beam recorder, electron beam recorder, etc. used to provide the image etching (embossing) can be used to form the optically detectable marks (e.g., pits and lands) for the control information. Other forms for the control information can be provided as well, such as barcodes, etc. In other embodiments, direct plasma etching can be applied to a substrate material such as glass, metal, etc.

Generally, the data content (images and computer data) are written to one or more data recording layers. The layers may be embedded within the overall thickness of the substrate. One or more protective layers may be formed over the data recording layers.

Figure 5:
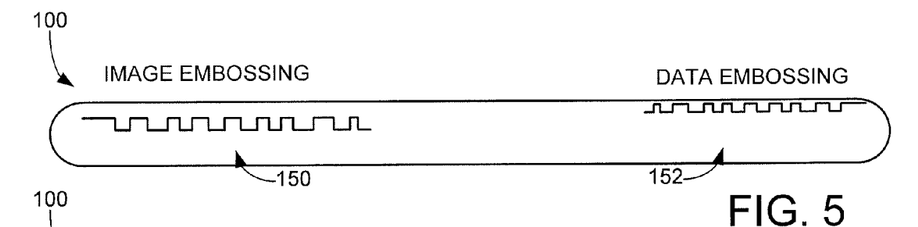
FIG. 5 is an illustrative format for the substrates of FIGS. 1A-1B in accordance with some embodiments.
Figure 6:
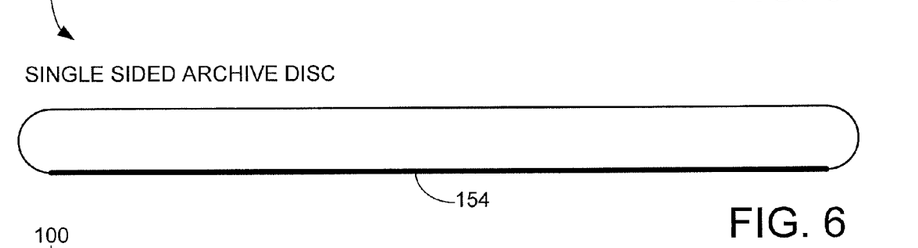
FIG. 6 is an illustrative format for the substrates of FIGS. 1A-1B in accordance with some embodiments.
Figure 7:
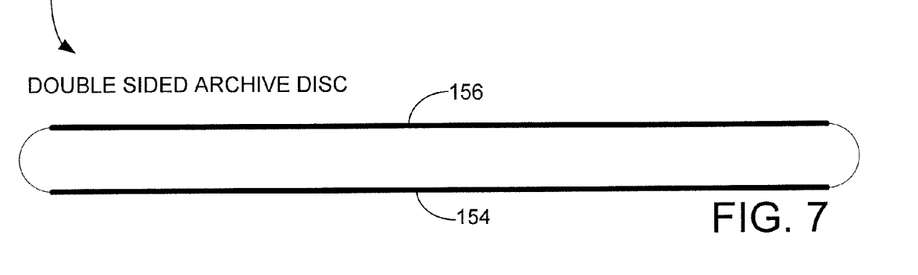
FIG. 7 is an illustrative format for the substrates of FIGS. 1A-1B in accordance with some embodiments.

FIGS. 5-7 illustrate different formats for the discs 100 formed by the write system of FIG. 4. FIG. 5 depicts a first region 150 with an image embossing zone 152 and a data embossing zone 154. The respective zones can be on a common recording layer embedded within the disc 100, or can be on different recording layers. As shown in FIG. 5, the data may be written to a first recording layer and the images may be written to a different, second recording layer. The layers may be coextensive across the radius of the disc 100.

The archive disc 100 can be single sided so as to be accessed from a single side, such as a lower side 154 in FIG. 6. Alternatively, the archive disc 100 can be double sided so as to be accessed from the lower side 154 and an upper side 156 as depicted in FIG. 7. A double sided archive disc would tend to have substantially twice the data storage capacity of a single sided disc. The embossments may be encapsulated within the substrate by a layer of polycoat or other protective material. Alternatively, the etching may be on the surface, such as in the case of an etched glass or metal disc, etc.

Figure 8:
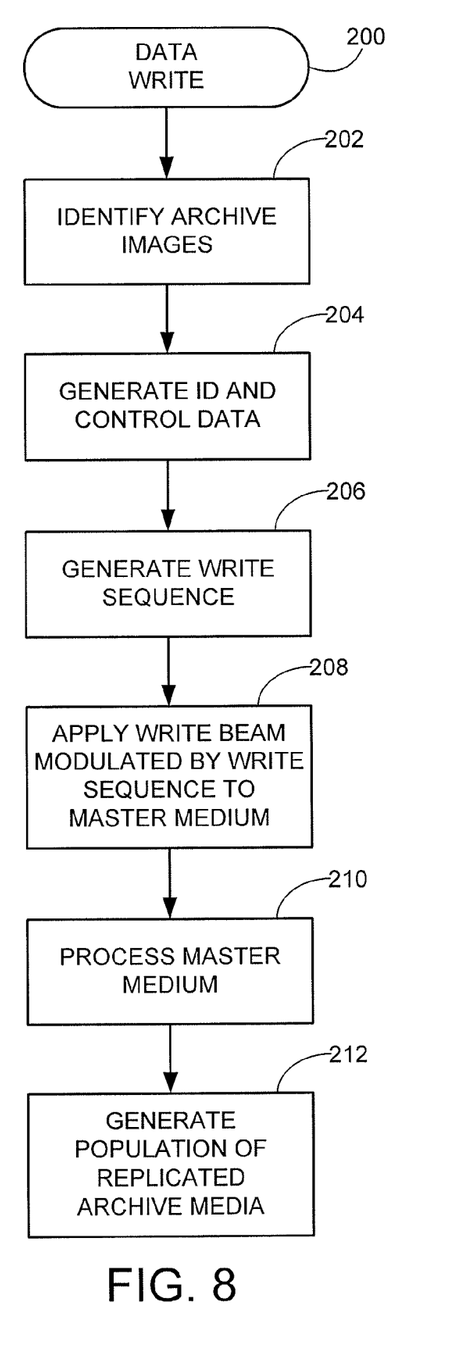
FIG. 8 is a flow chart for a DATA WRITE routine illustrative of steps that may be carried out in accordance with some embodiments to write archived images and control data to an archive substrate.

FIG. 8 is a WRITE DATA routine 200 illustrative of steps that may be carried out in accordance with some embodiments of the present disclosure to write archive images and control data to the disc 100. Archive images are first identified at 202 and may be arranged such as by well known scanning techniques, image print techniques, etc. While the images are contemplated as being black and white images, such is merely exemplary and not limiting. Depending on the embossing and image detecting technology, other spectra image recordation may be used including grayscale, full color imaging, etc.

ID and other control data are generated at step 204. This may include cataloging and mapping the various archive images to be provided on the disc. As desired, other computer readable files, including files corresponding to the archive images, may also be generated or otherwise provided at this step.

A write sequence is generated at step 206 to provide a sequence for embossing the disc to store the image and control data. The image data may be in the form of a black/white pixel map (or other suitable image format). The control data may be in the form of fixed sized data blocks, or sectors, and may further include error correction codes (ECC) to aid in data readback signal processing.

One or more write beams are modulated at step 208 to write the write sequence as a sequence of physical marks (embossments) to a master medium. The master medium may be a master disc that is controllably rotated and the write beam impinges a prepared layer of coating material that reacts to the impinged write beam. As noted above, these steps may be carried out using otherwise conventional optical media processing technology, such as an LBR or an EBR, or some other suitable process including processes used in the formation of semiconductors, etc.

The exposed master is processed at step 210, such as by the generation of a population of stampers using metallization and other techniques to form a population of replicated optical media at step 212 via injection molding or other known processes.

Figure 9:
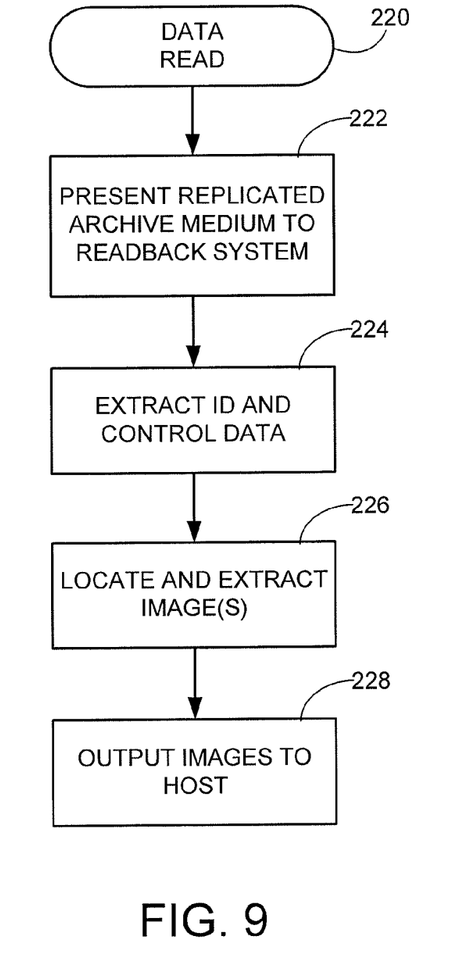
FIG. 9 is a flow chart for a DATA READ routine illustrative of steps that may be carried out in accordance with some embodiments to recover archived images from an archive substrate.

A DATA READ routine 220 is set forth by FIG. 9. An optical archive medium such as generated by the routine 200 of FIG. 8 is presented to a readback system at step 222. An optical detector is used at step 224 to extract the ID and other control data from the medium. The extracted data are used to locate and extract one or more archived images at step 226, which are subsequently output, in a digital form, to a host at step 228.

Figure 10:
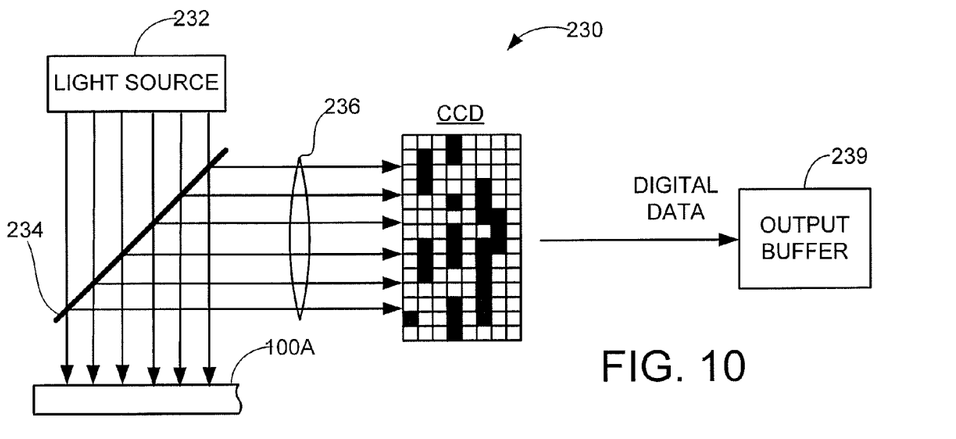
FIG. 10 shows another readback system in accordance with some embodiments that generates a computerized data output from an archive substrate.

FIG. 10 illustrates another readback system 230 in accordance with some embodiments. The readback system includes a light source 232 that applies light (such as broad spectrum or cohesive light) or other electromagnetic radiation (including in a non-visible spectrum) upon a selected archive substrate 100A.

A pass through reflection assembly 234 directs a reflected set of light/electromagnetic radiation from the substrate 100A through a lens 236 to a charge coupled device (CCD) array 238, which detects different optical response for the various individual pixels of the sensed archive image. The applied light spot may span the entirety of the image or a portion thereof so that all or a substantial portion of the image is concurrently detected. The CCD 238 outputs a bit sequence that can be temporarily stored in a buffer memory 239 pending transfer to a suitable host device for processing and display.

Figure 11:
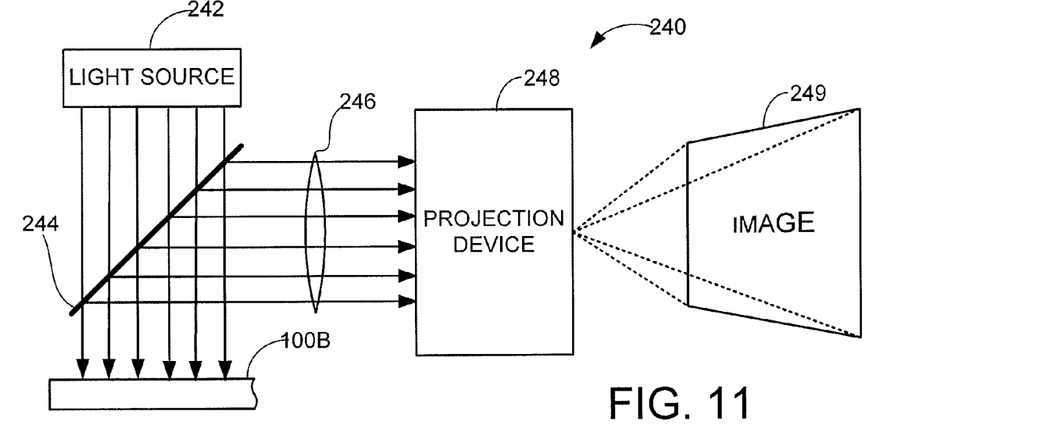
FIG. 11 is another readback system in accordance with some embodiments that generates an optical data output from an archive substrate.

FIG. 11 provides an alternative readback system 240 in accordance with other embodiments. As before, the readback system includes a light source 242 that applies broad spectrum or cohesive light or other electromagnetic radiation to a substrate 100B. A pass through reflection assembly 244 directs the reflected light/radiation through a lens 246 to a projection device 248 which projects the recovered image onto a larger display 249, as shown. The configuration of FIG. 11 thus operates analogously to a microscope with a greatly enlarged image projected onto a wall or other viewing location.

Figure 12:
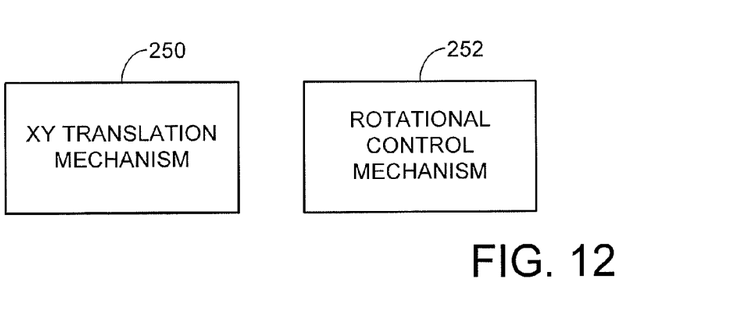
FIG. 12 illustrates actuating mechanisms that can be used in accordance with the various readback systems set forth above to locate and recover an archive image.

FIG. 12 provides further aspects of readback systems such as 230, 240. The readback systems include an XY translation mechanism 250 and a rotational control mechanism 252. The XY translation mechanism directs movement of recovery aspects of the readback system to different XY coordinates of the substrate (e.g., the substrate is contemplated as lying along an XY plane). The rotational control mechanism 246 allows precise rotational positioning of the substrate.

While it is contemplated that archive images may be captured and displayed/processed during continuous disc (substrate) rotation, in other embodiments the disc/substrate may be held in a fixed angular orientation during the transfer of the archive image data, and intermittently rotated or otherwise translated to provide the requisite alignment between the substrate and the readback system. Similarly, during recording the master substrate may be continuously rotated or may be periodically advanced angularly and then held in position while the writing beam is advanced in the XY plane.

Figures 13, 14, 15:
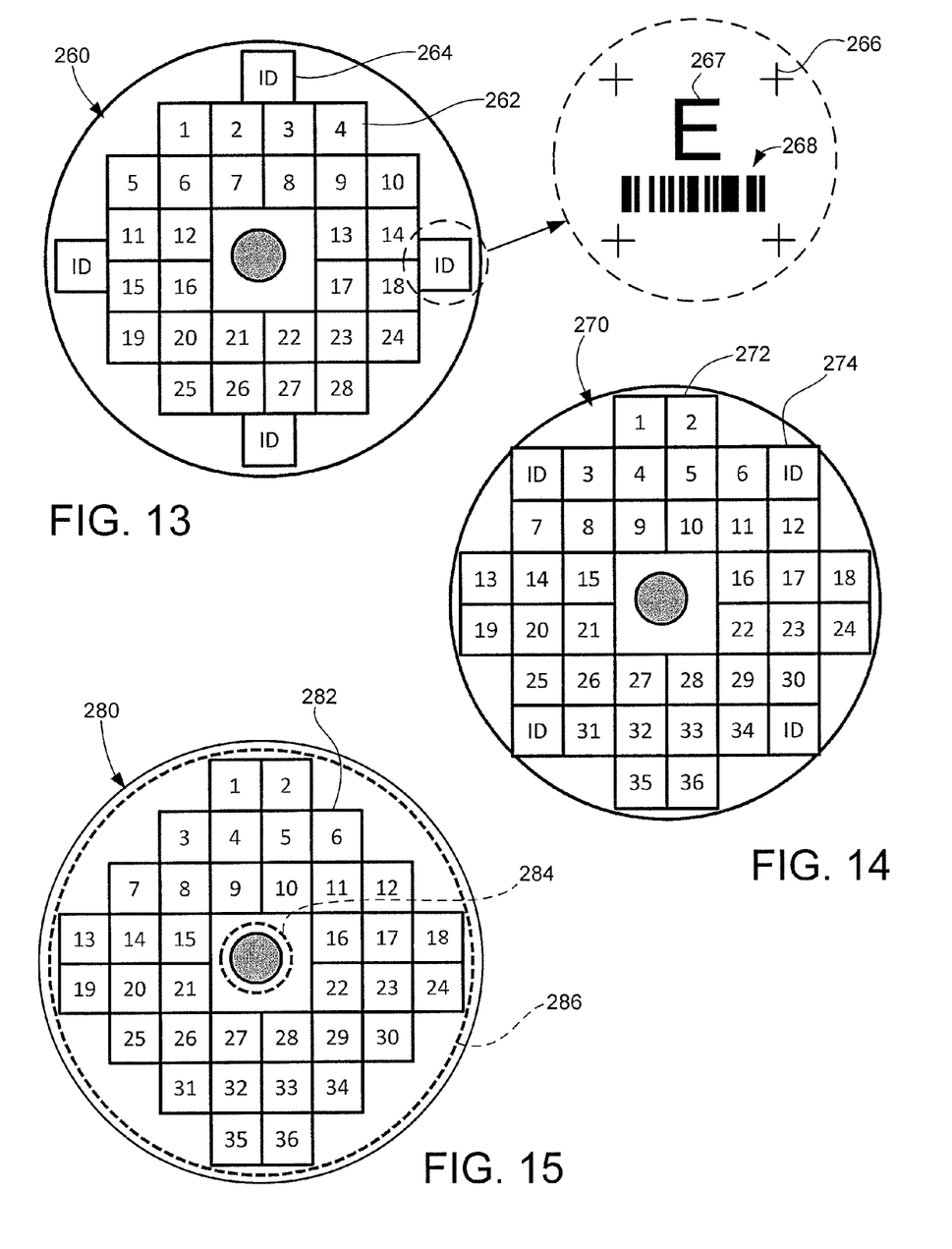
FIG. 13 shows another image archive optical substrate in accordance with some embodiments.
FIG. 14 shows another image archive optical substrate in accordance with further embodiments.
FIG. 15 shows another image archive optical substrate in accordance with still further embodiments.

FIG. 13 illustrates another example substrate 260 formatted in accordance with some embodiments. The substrate 260 includes a total of 28 image tiles 262 and four ID tiles 264. As before, the image tiles 262 constitute archived images of documents or other information set forth in a human viewable, microscopic visual format, and so it is contemplated that many more image tiles will tend to be placed on the substrate, and each image tile will be substantially smaller, than as represented in FIG. 13.

The ID tiles 264 can be a simple square pattern which only provides a border or some other form of optically detectable pattern such as a completely filled in uniformly colored geometric shape, a regular or irregular pattern, etc. In one embodiment, each ID tile 264 includes indicia such as crosshair marks 266 to denote the corners of the ID tile, and by extension, the length and width dimensions of the image tiles 262.

Additional indicia, such as a unique positional indicia 267 (e.g., "E" for "East") can be included in each of the ID tiles 264. In this way, the four ID tiles 264 can provide coordinate references for the image tiles (e.g., North, South, East and West). Coordinates for the individual image tiles 262 can be specified in relation to one or more of the ID tiles 264. Alternatively, each of the ID tiles 264 can be nominally identical.

The ID tiles 264 can store data such as bar code 268. This can be used to identify the contents of the image tiles 262, the location of the ID tile 264, etc. Such data can be recorded in any suitable format including optically detectable data in the form of bar codes, text, modulated data strings, multi-dimensional bar codes, OCR, etc. The ID tiles can additionally or alternatively store data in a non-human readable, computer readable format such as optical, magnetic, electrical, solid state or other formats. The ID tiles can be placed in any space not taken up by the image tiles and can be of any suitable shape and location.

In further embodiments, computer readable information is provided on the substrate 260, such as but not limited to the ID tiles 264, to provide a reference input to a separate computer readable database stored in a memory (not shown in FIG. 13). Reference to the database can enable identification of the geometric position(s) of the desired image tile(s) 262, allowing a readback system to locate and retrieve the desired image(s).

FIG. 14 provides another example substrate 270 with 36 image tiles 272 and four ID tiles 274. The image tiles 274 can be formatted as discussed above and can be located at any suitable locations, including so-called "corner" locations as shown.

FIG. 15 illustrates yet another example substrate 280 with 36 image tiles 282. The corresponding ID data are arranged in one or more circular ID bands, such as inner band 284 and outer band 286. The bands 284, 286 can take any suitable format including a computerized data format arranged along one or more tracks. In this way, a suitable data transducer can be positioned adjacent the bands to recover the data stored thereto as the substrate is moved relative to the transducer.

Figure 16:
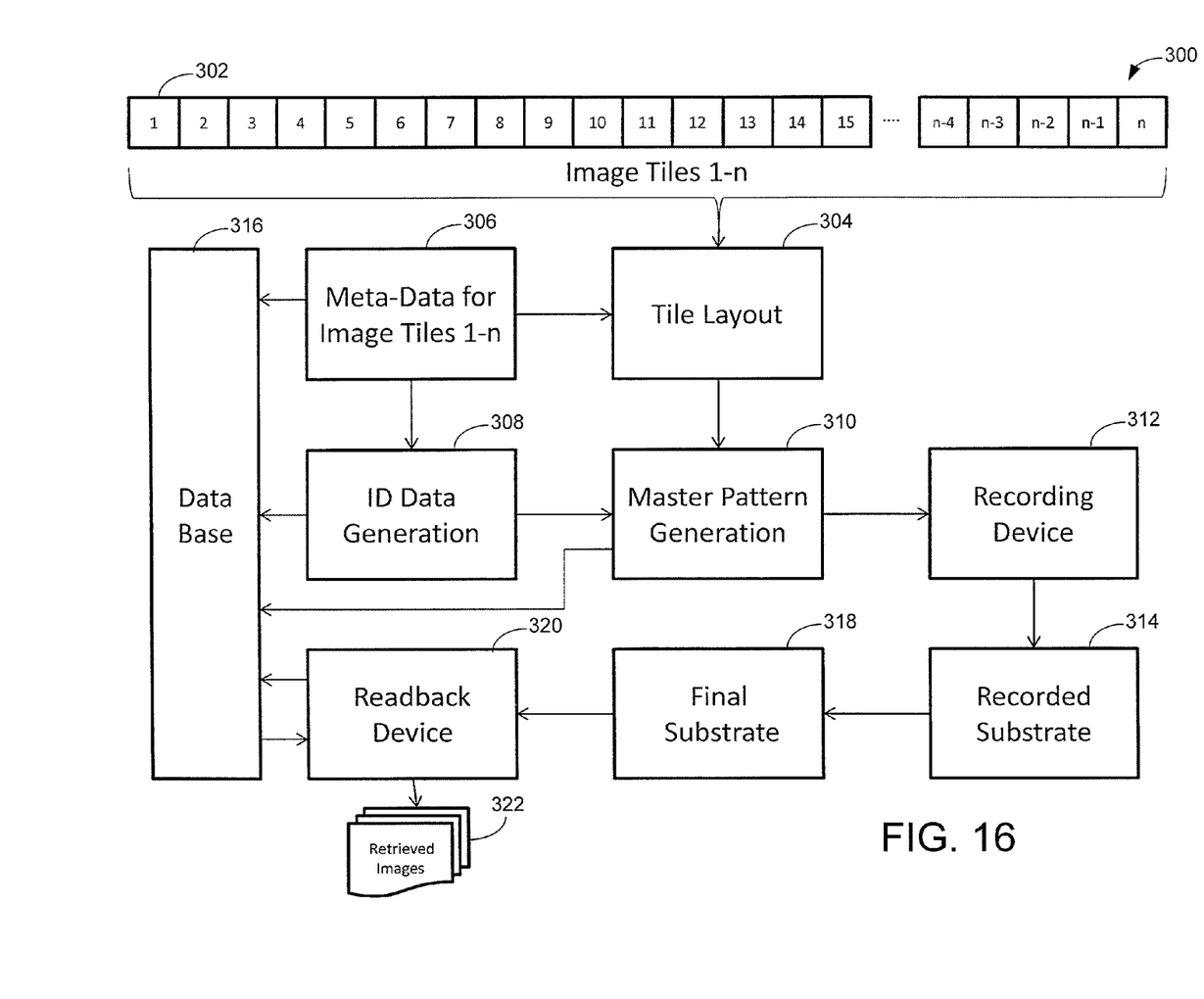
FIG. 16 is a functional block representation for a system adapted to generate and access image archive optical substrates such as set forth in FIGS. 13-15.

FIG. 16 provides a functional block diagram for a processing system 300 constructed and operated in accordance with various embodiments to store and recover data to/from a substrate such as the substrates 260, 270, 280 in FIGS. 13-15. It will be understood that the various modules and operative blocks set forth in FIG. 16 can be realized in hardware, software and/or firmware and may include executable programming and control data utilized by one or more hardware based or programmable processors and associated computer readable memory.

A collection of n image tiles 302 numbered 1-n are generated using any suitable methodology discussed above. It is contemplated that digital representations of the image content of the tiles 302 may be temporarily stored in a memory. The image tiles 302 are supplied to a tile layout module 304 which generates an arrangement pattern for the associated substrate, taking into account the relative sizes, shapes and densities of the individual images.

Metadata (e.g., control data) for the image tiles are generated by a metadata generation module 306. The metadata may include, but are not limited to, the number of tiles, a description of the tile set, the maximum recording area dimensions, tile sizes, pixel densities (e.g., dots per inch, DPI), the format for an associated searchable database to be used during subsequent recovery operations, etc.

The metadata or portions thereof may be supplied to the tile layout module 304 to facilitate development of the final layout, as well as to an ID data generation module 308 which generates unique ID blocks to be placed on the recorded substrate. As noted above, the ID blocks can take any number of suitable forms including bar codes, tag values, geometric shapes and/or patterns, data configured in accordance with an existing modulation scheme such as CD (compact disc), DVD (digital versatile disc), BD (blu-ray disc) data formats, etc.

A master pattern generation module 310 receives inputs from the tile layout module 304 and the ID data generation module 308 and combines the image data with the ID block data to generate a final layout for the substrate and supply input write data to a recording system 312 which transfers the data to a substrate 314 as discussed above. Various control parameters such as metadata, ID values, location information, etc. may be transferred to a database structure 316 stored in a suitable memory for future reference.

The recorded substrate 314 may be in the form of a master substrate from which one or more replicated, final substrates 318 are formed using suitable processing as discussed above. Alternatively, the recorded substrate can constitute the final substrate.

During a subsequent data retrieval operation, a readback device 320 accesses the final substrate 318 to locate and output one or more desired images. The readback device 320 may recover ID data from the final substrate and use this to access the database structure 316 in order to locate the exact location of the desired image(s). The retrieved images 322 are thereafter output to a suitable output device, such as by being transferred to a memory, displayed on a display device, printed to hard copy, etc.

Figure 17A:
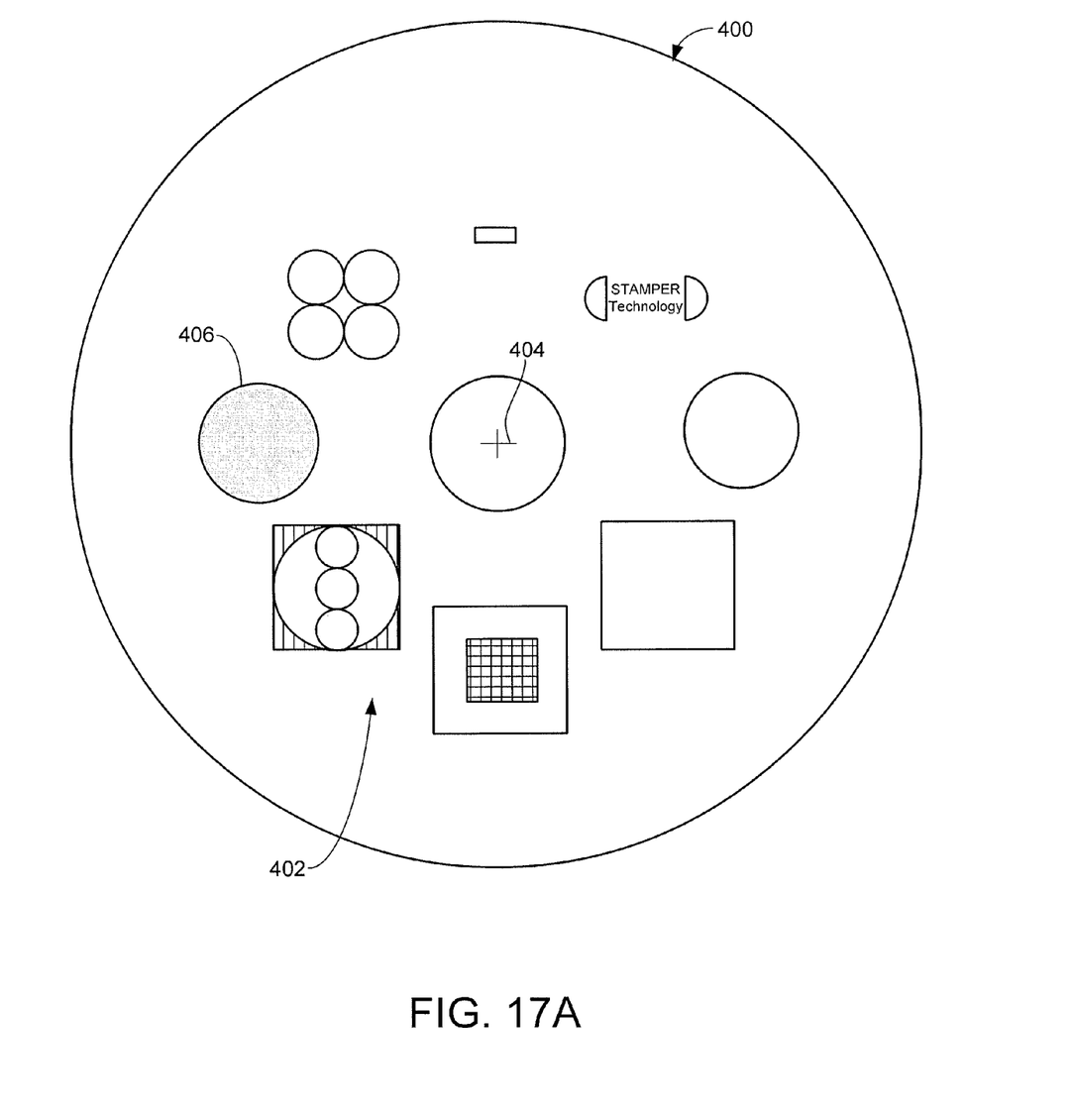

FIGS. 17A-E provide a graphical representation of an example physical substrate 400 that was processed in accordance with various embodiments discussed above to provide an archive disc. FIG. 17A shows the substrate 400 to store an array of optically detectable features 402, which were formed as various holographic, graphical and image features using a writing system as set forth in FIG. 16. The features 402 are arrayed around a central rotational axis 404 of the substrate 400. The substrate 400 generally conforms to a standard optical disc (e.g., CD, DVD, BD) with an outermost diameter of nominally 120 millimeters, mm.

Of particular interest is a selected feature 406 on the archive disc 400, which generally comprises a disc-shaped zone with a diameter of less than about 2 centimeters (cm). The feature 406 is shown more clearly in FIG. 17B to constitute over six hundred (600) image tiles 410, with each image tile 410 providing a separate page of text from a copy of the King James Bible.

Figure 17B:
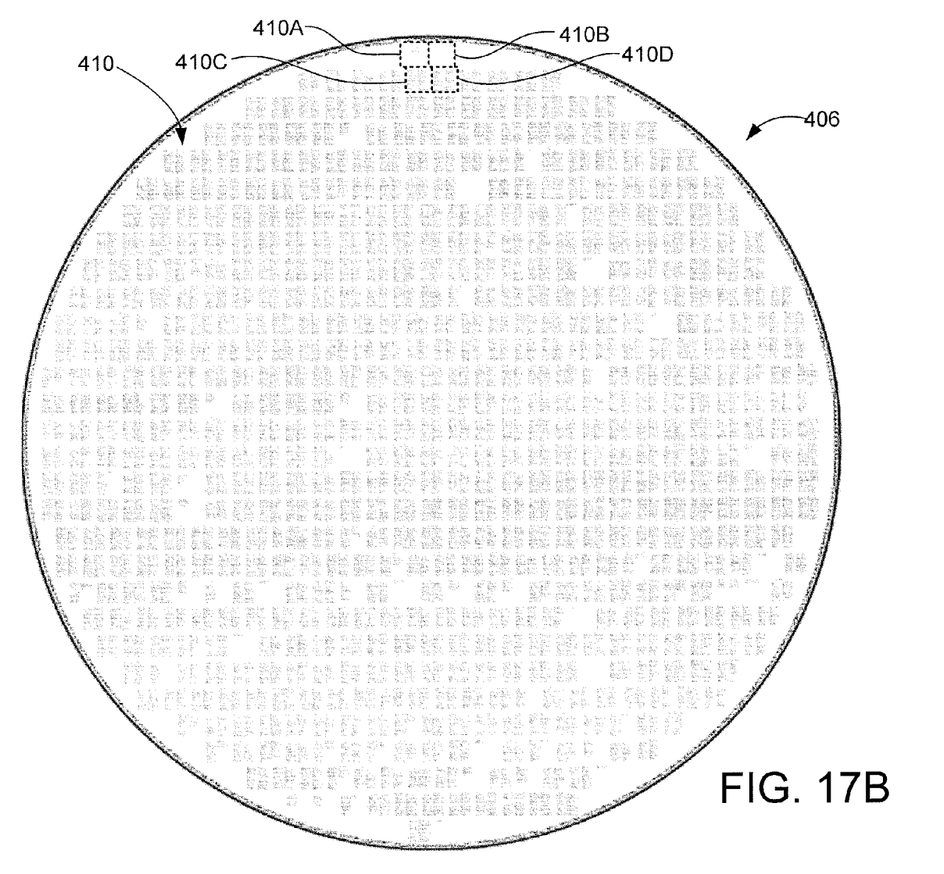
Figure 17C:
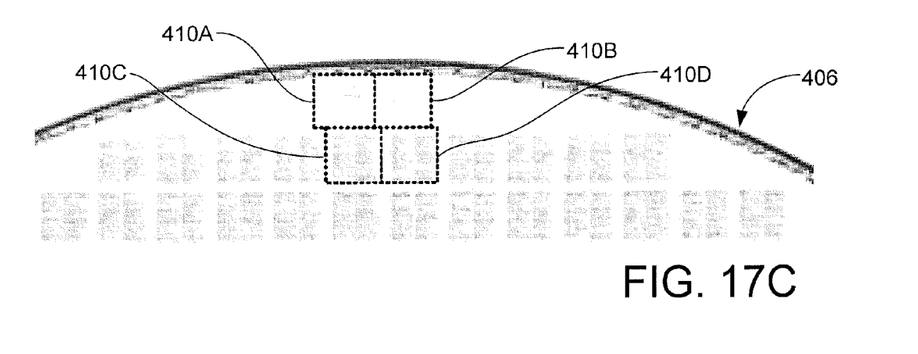

Four individual image tiles (pages), denoted as 410A, 410B, 410C and 410D, are shown in greater detail in FIGS. 17C and 17D. It will be noted that image tiles 410D and 410E are truncated in FIG. 17D for clarity of illustration. Tile 410A constitutes a title page, tile 410B constitutes a table of contents, and tiles 410C and 410D are sections of text. The table of contents tile 410B is shown in greater clarity in FIG. 17E.

Figure 17E:
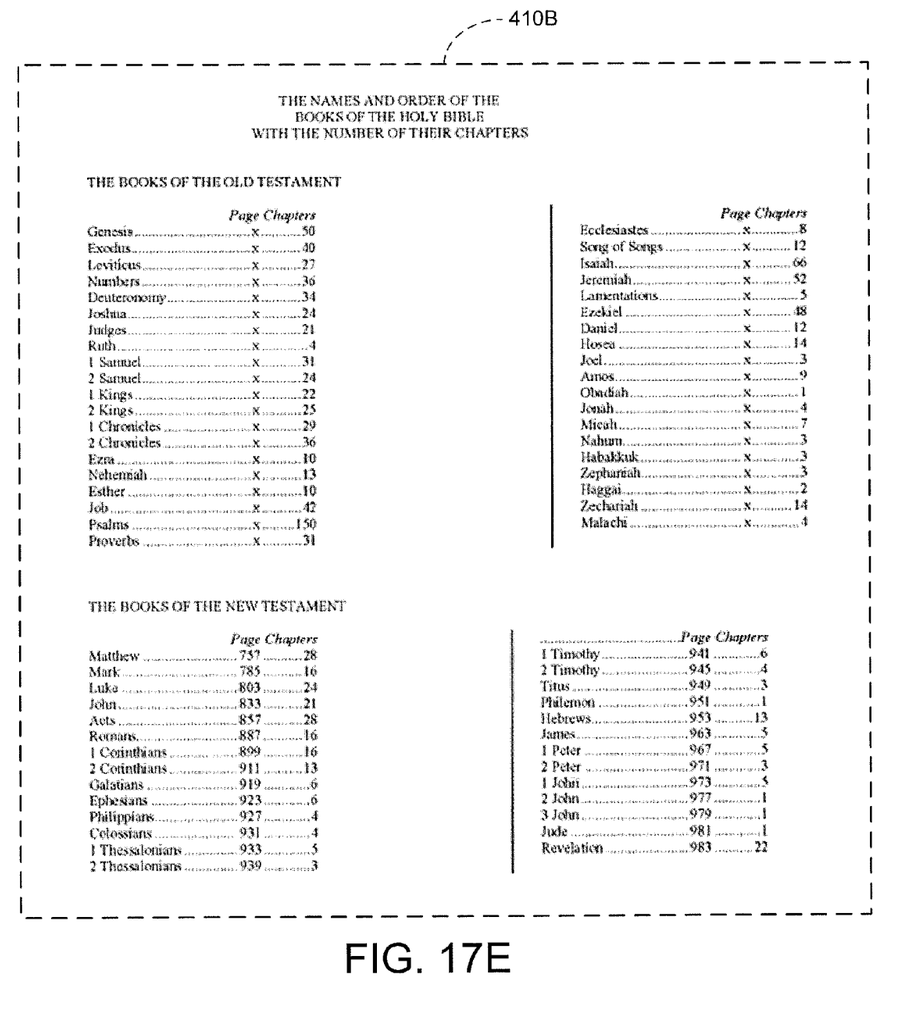

As can be seen, each page includes textual information in an alphanumeric format, in this case in the English language, at sufficient resolution to enable retrieval of the contents of the individual pages.

The individual tiles can immediately abut one another, as depicted by tiles 410A and 410B, or a small intervening gap can be provided between adjacent tiles such as depicted by tiles 410A and 410C. While not shown in the example of FIGS. 17A-17F, borders or other delineating markers, such as corner cross-hatches, can be used to mark the boundaries of the individual pages.

Each page in the zone 406 is on the order of about 25 microns (μm) in width (25×10-6 meters), and was written using an electron beam recorder (EBR) type writing device of the current art. Larger and/or smaller sized images can be generated as desired, including images on the order of about 20 μm or less, 50 μm or less, 100 μm or less, 250 μm or less, 500 μm or less or 1000 μm or less. In some cases, the overall size of the images is selected in relation to the total available surface area and the total number of images to maximize the sizes of the individual tiles.

It can be seen that the entire surface of the substrate 400, if adapted to store archive images of about the same size as the archive image tiles 410 in feature 406, would accommodate upwards of about 100,000 images or more per recording layer. This would be more than sufficient to accommodate several hundred copies of the entire King James Bible as formatted in FIGS. 17A-17E. Other numbers of image tiles can be provided on the storage medium, including about 1,000 image tiles, about 10,000 image tiles, about 1,000,000 image tiles, and other numbers less or more than these values. While not separately shown in FIGS. 17A-17E, if an ID tile were inserted into the feature 406, the ID tile could be located and used to establish the expected size of the remaining images within the feature. Any particular page could thereafter be accessed and retrieved by moving (via the XY mechanism) the appropriate XY coordinate distances from the ID tile.

Another advantage of the use of the ID tile (or other sizing and location mechanisms) is that, in a replication environment, the formation of injection molded replicas (and other forms of replicated substrates) may experience shrinkage or other dimensional deformations as compared to the master substrate. Objects may be found to shrink by about 1% to 4%, for example, using conventional optical disc (DVD, BD) disc replication technologies. Thus, by locating and determining the size of an ID tile that has dimensions selected in relation to the dimensions of the remaining images can allow the readback system to calibrate accordingly and precisely access and retrieve the required images.

In one embodiment, one entire surface or recording layer of an image archive substrate (carrier or disc) is used to store images such as the image data, and another surface or recording layer of the substrate stores computer readable data associated with the image data. Computer readable data in the form of programming, for example, can be supplied as the computer readable data in the form of addressable logical data blocks to provide an executable program on a host system, and the programming can be used to provide access, transfer and display of image data from the images. Other applications will readily occur to the skilled artisan in view of the present disclosure, including the archiving of copies of artwork, etc.

It will now be appreciated that the various embodiments presented herein can provide a number of benefits over the prior art. High capacity data image archiving can be provided using conventionally sized and machine readable optical media, such as but not limited to DVDs and BDs, as well as other types and styles of substrates.

By capturing and storing actual physical (tiny) images of the archived documents, an efficient data storage mechanism is provided. Substantially no overhead is required to store the data in a computerized format (e.g., headers, footers, ECC correction data, decoder software, etc.). Similarly, no accessibility problems are provided since no software translations, codecs, applications, drivers, etc. are necessary in order to recover the images from the disc/substrate. Thus for example, the images do not require a specially configured JPEG/GIF/MPEG etc. translation layer to enable recovery of the archive data; as desired, a high powered microscope or other image recovery device will be sufficient to directly recover the image data.

The use of the ID tile (or other sizing mechanism) advantageously allows for the ready location and sizing of the individual images; while it is not necessarily required that the ID tile be the exact same size as the archived images, a predetermined relation between the size of the ID tile and the images can be used to facilitate ready access. For example, if the images are nominally X microns in size and the tile (prior to writing) is sized to be exactly 1 micron×1 micron, a precise measurement of the ID tile can determine a derating factor that then can be used to calculate the location and size of every archive image on the substrate.

While the various embodiments discussed above have contemplated the storage of black and white documents (such as the pages from the bible set forth in FIGS. 17A-17E), multi-color images can also be stored in this manner, provided the underlying substrate and the writing process is configured to support the required color depth. In this way, the various embodiments disclosed herein can be adapted to store audio/visual works, such as a full length movie.

In one example, a movie of about 120 minutes in total length and displayed at 30 frames/second would require about (30×60×120=216,000 individual frames, or archived images. A readback system could be constructed to easily extract, buffer and project the images from an image area while concurrently outputting corresponding audio soundtrack data from tracks formed on the media such as discussed above including in FIG. 15. Multiple images could be combined to provide the individual frames. The order of the images could be made to enhance the sequential outputting thereof, such as in a spiral or concentric pattern including as discussed above in FIG. 1B, or a raster pattern as in FIG. 1A. Accordingly, the term "archive data" will be broadly understood to describe data stored in the form of human detectable images on the substrate, albeit with the requirement of the application of significant magnification, regardless whether the images are "old" or "new."

While various embodiments have been presented in the context of an optical disc, such is merely exemplary and is not limiting. Similarly, while rotational translation of the media has been presented as a particularly useful mode of operation, such is also merely exemplary and is not limiting.

For purposes herein, human detectable images and the like include a variety of wavelength spectra and are not necessarily limited to the visible light spectrum, like microfiche, but instead can be extended to the UV, IR, microwave or other spectra including all detection and recording wavelengths that can be detected including by SEM and AFM systems.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An optical medium comprising a substrate which stores a plurality of archived images in a human detectable form on a surface of the substrate and control data associated with the archived images to facilitate optical recovery of said human detectable images from the surface, the archived images arranged as a sequence of adjacent tiles on a recording layer of the optical medium each tile having an associated length and width, the control data comprising at least one identification (ID) tile adjacent the archived tiles having an associated length and width selected in relation to the length and width of each of the tiles.

2. The optical medium of claim 1, in which the length and width of the at least one ID tile are nominally the same as the length and width of each of the tiles.

3. The optical medium of claim 1, in which the archived images are arranged as a sequence of adjacent tiles, each tile having an associated length of about 25 microns ($\mu$m) or less and an associated width of about 25 $\mu$m or less.

4. The optical medium of claim 1, in which the identification tile has a boundary indicia mark that denotes an area corresponding to the area of each of the adjacent tiles of the images.

5. The optical medium of claim 1, in which each of the archived images is characterized as an image of a human readable document comprising alphanumeric characters, and the control data comprises non-human readable, computer readable data to facilitate location of the respective tiles on the medium.

6. The optical medium of claim 1, in which the substrate is characterized as an optical disc rotatable about a central rotational axis.

7. The optical medium of claim 6, in which the images are arranged in rows and columns across the recording layer with each image oriented in a common direction.

8. The optical medium of claim 6, in which the images are arranged concentrically about the central rotational axis in a sequence of radially extending bands, with each image oriented in relation to an angular position of said image.

9. The optical medium of claim 1, in which the archived images are individual documents.

10. The optical medium of claim 1, in which the archived images are frames of an audio/visual work.

11. A system for forming an image archive substrate, comprising:
    an image layout system which generates input data corresponding to a plurality of human detectable archive images;
    a control data generator which generates control data associated with the archive images;
    a recording device which impinges a recording layer of a substrate with a write beam to store the archive images in a human detectable form and to store the control data to facilitate optical recovery of the archive images from the recording layer, the substrate characterized as a master substrate; and
    a replication block which generates a population of nominally identical replicated substrates from the master substrate.

12. The system of claim 11, in which the archive images are arranged as a plurality of adjacent image tiles, and the control data comprises at least one identification (ID) tile adjacent the image tiles.

13. The system of claim 11, in which the control data further comprises non-human readable, computer data stored to the substrate associated with the archive images.

14. The system of claim 11, further comprising a readback device which optically detects the images from at least a selected one of the nominally identical replicated substrates and outputs the detected images for display on a display device.

15. The system of claim 14, wherein the readback device accesses a database structure in a memory to identify a relative location of a selected image responsive to detection of the control data from the at least a selected one of the nominally identical replicated substrates.

16. A method of archiving images, comprising:
    using a write beam of a recording device to impinge a recording layer of a master substrate to store a plurality of archived images in a human detectable form and control data associated with the archived images on the master substrate;
    forming a nominally identical replica substrate from the master substrate; and
    retrieving at least a selected one of the archived images from the replica substrate using a readback device which optically detects the images from the replica substrate and outputs the detected images for display on a display device.

17. An optical medium comprising a substrate which stores a plurality of archived images in a human detectable form on a surface of the substrate and control data associated with the archived images to facilitate optical recovery of said human detectable images from the surface, the archived images arranged as a sequence of adjacent tiles, each tile having an associated length of about 25 microns ($\mu$m) or less and an associated width of about 25 $\mu$m or less.

18. The optical medium of claim 17, in which the control data comprises at least one identification tile having a boundary indicia mark that denotes an area corresponding to the area of each of the adjacent tiles of the images.

19. The optical medium of claim 17, the archived images arranged as a sequence of adjacent tiles on a recording layer of the optical medium each tile having an associated length and width, the control data comprising at least one identification (ID) tile adjacent the archived tiles having an associated length and width selected in relation to the length and width of each of the tiles.

20. The optical medium of claim 17, in which the control data comprises at least one identification tile having a length and width nominally the same as a length and width of each of the archived tiles.

* * * * *